US008303397B2

(12) United States Patent
Mizue

(10) Patent No.: US 8,303,397 B2
(45) Date of Patent: Nov. 6, 2012

(54) GAMING MACHINE THAT FORMS A WINNING PATTERN UTILIZING A REDUCED CELL

(75) Inventor: Hayato Mizue, Tokyo (JP)

(73) Assignee: Konami Gaming, Incorporated, Las Vegas, NV (US)

( * ) Notice: Subject to any disclaimer, the term of this patent is extended or adjusted under 35 U.S.C. 154(b) by 289 days.

(21) Appl. No.: 12/722,521

(22) Filed: Mar. 11, 2010

(65) Prior Publication Data

US 2011/0223984 A1 Sep. 15, 2011

(51) Int. Cl.
*A63F 9/24* (2006.01)
*A63F 13/00* (2006.01)

(52) U.S. Cl. ................................ 463/20; 463/16; 463/31

(58) Field of Classification Search .................... 463/16, 463/20, 31
See application file for complete search history.

(56) References Cited

U.S. PATENT DOCUMENTS

| | | | | |
|---|---|---|---|---|
| 5,395,111 A | | 3/1995 | Inoue | |
| 7,128,647 B2 * | | 10/2006 | Muir | 463/20 |
| 7,473,173 B2 | | 1/2009 | Peterson et al. | |
| 2002/0094857 A1 * | | 7/2002 | Meyer | 463/16 |
| 2004/0009803 A1 * | | 1/2004 | Bennett et al. | 463/16 |
| 2004/0023714 A1 * | | 2/2004 | Asdale | 463/22 |
| 2006/0019738 A1 * | | 1/2006 | Baerlocher et al. | 463/20 |

* cited by examiner

*Primary Examiner* — Milap Shah
*Assistant Examiner* — Lawrence Galka
(74) *Attorney, Agent, or Firm* — Leason Ellis LLP

(57) ABSTRACT

A gaming machine includes a lottery region defined such that cell columns are arranged to be parallel with each other. Symbols in each symbol column are moved along the cell column at a predetermined game opportunity and are stopped in one cell unit. A determination is performed as to whether a combination of symbols stopped in a determination target cell group forms a prize winning pattern. Reduced cells are defined by equally dividing a cell in a cell column when a predetermined reduction condition is satisfied, reduces symbols corresponding to the reduced cells, recognizes that at least one normal cell and the reduced cells are included in the target cell group, selects the reduced cells included in the target cell group, and determines that a combination of a symbol stopped in the selected reduced cell and the normal cell included in the target cell group forms the prize winning pattern.

7 Claims, 11 Drawing Sheets

GAMING MACHINE THAT FORMS A WINNING PATTERN UTILIZING A REDUCED CELL

BACKGROUND OF THE INVENTION

1. Field of the Invention

The present invention relates to a gaming machine, such as a slot machine, that moves plural symbol columns along cell columns defined as symbol stop positions, and determines whether a combination of symbols displayed in a predetermined cell group when these symbol columns are stopped forms a predetermined prize winning pattern.

2. Description of the Related Art

In a conventionally known slot machine, plural cells serving as symbol stop positions are defined so as to be arranged in a matrix of a predetermined number of rows and number of columns on a front surface of a casing, and a physical or virtual reel is disposed with respect to each of cell columns in a longitudinal direction. On the reel, plural kinds of symbols, for example, numerals or drawing patterns are arranged in a predetermined arrangement sequence, and thus each reel serves as a symbol column. When a player deposits coins or alternative coins such as medals or tokens and performs a betting operation, a game starts and reels start to rotate along cell columns. If a predetermined stop time elapses, the reels are stopped such that one symbol appears in each cell. If the symbols stopped in the cells form a predetermined prize winning pattern, for example, a pattern where the same symbols are arranged in a row direction, an allotment according to the prize winning pattern is provided to the player. In this kind of slot machine, generally, cell sizes are equal to each other, and one symbol is disposed in a region on the reel corresponding to one cell. The stop position of the reel is controlled using the size of the corresponding cell in the column direction as a unit. Thereby, one symbol is displayed in one cell. A gaming machine of a slot machine type where an allotment higher than that of the normal case is provided when plural symbols of the same kind are disposed on a region on the reel having the same size as that of one cell and these symbols are included on a prize winning line is provided (for example, refer to Patent Documents 1 and 2).

[Patent Document 1] U.S. Pat. No. 7,473,173B2

[Patent Document 2] U.S. Pat. No. 5,395,111 A

In the conventional gaming machine, the plural symbols are simply stored in one cell and the sizes of the cells never change. Since the stop position of the symbol is controlled in a cell unit, a high allotment is obtained only when the plural symbols are stopped in a prize winning determination target cell. Accordingly, from the standpoint of the player, the high allotment is obtained only in the extremely limited case and a player's expectation for a realization of the prize winning pattern cannot be sufficiently heightened.

SUMMARY OF THE INVENTION

In order to solve the above problems, according to an embodiment of the present invention, there is provided a gaming machine in which a lottery region is defined such that plural cell columns are arranged therein, that plural cells serving as symbol stop positions are arranged in one direction in each cell column, and that the cell columns are arranged in a direction crossing a cell arrangement direction in each cell column, and plural symbol columns where plural symbols are arranged along the cell arrangement direction are disposed for each cell column such that a part of the symbols appears on the cells. The gaming machine includes a lottery unit that chooses a symbol to be displayed on each cell at predetermined game opportunity, a symbol column movement control unit that moves symbols of each symbol column along the cell column at the game opportunity and stops the symbols of each symbol column in a cell unit on the basis of a lottery result of the lottery unit, and a prize winning determining unit that determines whether a combination of the symbols stopped in a cell group of a determination target forms a prize winning pattern. In the gaming machine, a partial reduction state is at least temporarily generated, in the partial reduction state, the lottery region is defined such that the plural cell columns include a normal cell column where plural normal cells, each of which has a predetermined size, are arranged and a reduced cell column where plural reduced cells, each of which is obtained by equally dividing one normal cell in the cell arrangement direction, are continuously arranged in at least a portion of the reduced cell column, and in each of the symbol columns, the size of each symbol is set so as to accord with the size of each cell of the corresponding normal cell column or reduced cell column. The symbol column movement control unit stops the symbols of each symbol column in a cell unit in each cell column, regardless of whether the current state is the partial reduction state or not. The prize winning determining unit recognizes, when the current state is the partial reduction state, that at least one normal cell and the plural reduced cells continuously spanning the predetermined size in the cell arrangement direction are included in the cell group of the determination target, individually selects the plural reduced cells that are included in the cell group of the determination target, and determines whether a combination of the symbols stopped in the selected reduced cells and the symbols stopped in the normal cells included in the cell group of the determination target forms the prize winning pattern.

In the gaming machine according to an embodiment of the invention, when the current state is the partial reduction state, the normal cell column and the reduced cell column are defined in the lottery region, and the reduced cells continuously span the size corresponding to at least one normal cell in the reduced cell column. In the symbol column, the size of each symbol is set according to the size of the cell of the corresponding normal cell column or reduced cell column. Accordingly, the symbol that is positioned on the reduced cell is further reduced as compared with the symbol positioned on the normal cell. When the game opportunity is generated, the symbol to be displayed on each cell is chosen, the symbols of the symbol columns start to move, and each symbol of the symbol columns is stopped in a cell unit on the basis of the lottery result. The stop control is performed in the cell unit even in the partial reduction state.

Accordingly, as well in the normal cell included in the cell group of the prize winning determination target as in each reduced cell included in the cell group, an arbitrary symbol can be displayed from a series of symbols disposed in the symbol column. In the cell group of the prize winning determination target in the partial reduction state, the plural reduced cells that continuously span the size corresponding to one normal cell are included, and in the prize winning determination, the reduced cells are individually selected to thereby determine whether the prize winning pattern is formed with respect to each combination of the symbol stopped in the selected reduced cell and the symbol stopped in the normal cell. That is, plural combinations of the cells that become the determination target exist and it is determined whether the prize winning pattern is formed for each combination. Accordingly, like the case where, even though the prize winning pattern is not formed by one combination, while the prize winning pattern is formed in another combination or the case where the prize winning pattern is formed in each of the plural combinations, an aspect of the prize winning can be diversified. As a result, a player's expectation for a realization of the prize winning pattern can be heightened.

DETAILED DESCRIPTION OF THE PREFERRED EMBODIMENTS

Figure 1:
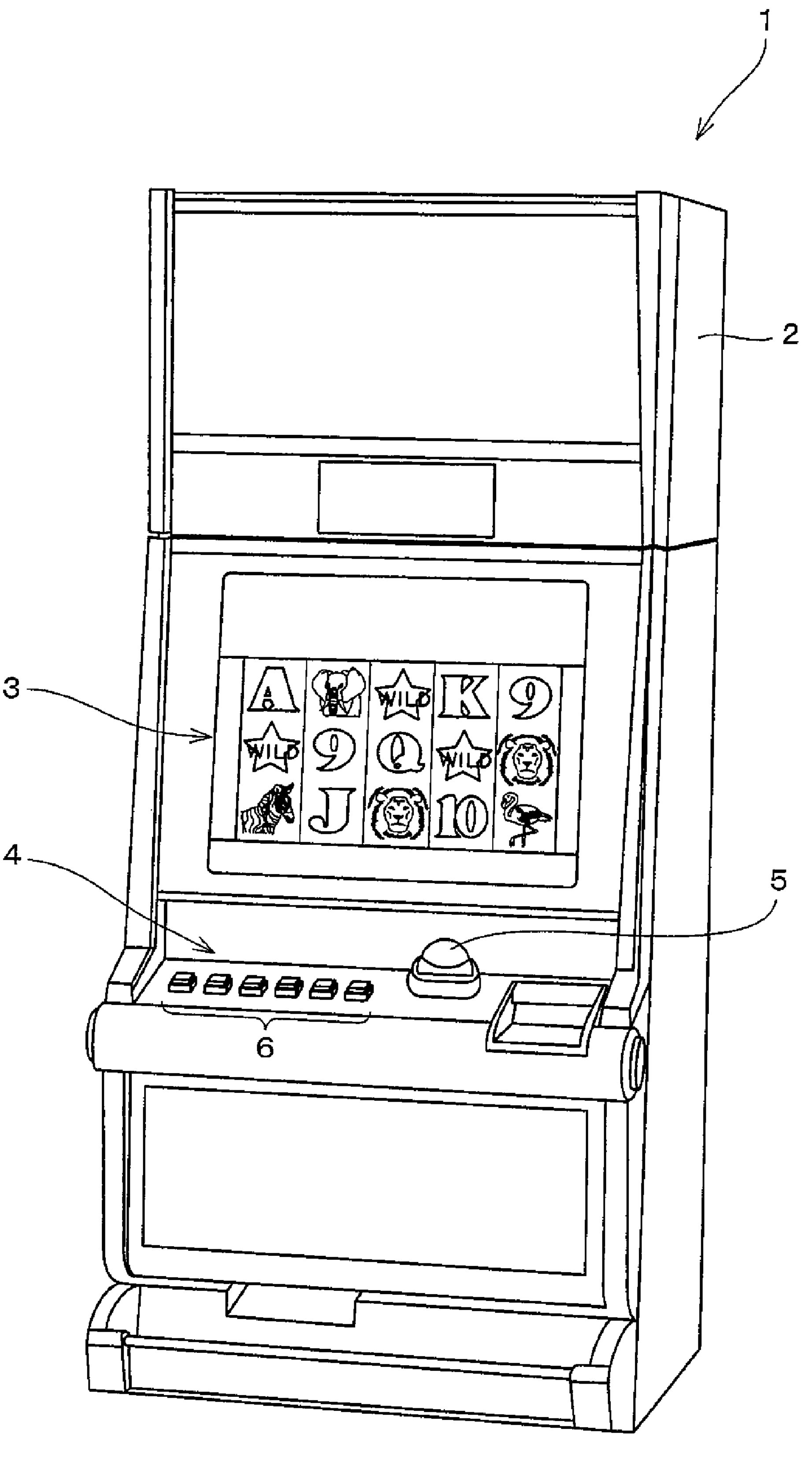
FIG. 1 a perspective view of a gaming machine according to an embodiment of the invention.

Hereinafter, an embodiment in which the invention is applied to a gaming machine of a slot machine type will be described with reference to the accompanying drawings. As illustrated in FIG. 1, a gaming machine 1 according to the embodiment has an upright casing 2, and on a front surface of the casing 2 is provided with a display device 3. The display device 3 is, for example, a liquid crystal display device. A control panel 4 is provided below the display device 3. On the control panel 4, there are provided a slot 5 of coins and an operation device 6. The operation device 6 includes operation members for performing various operations such as betting operation or the like.

Figure 2:
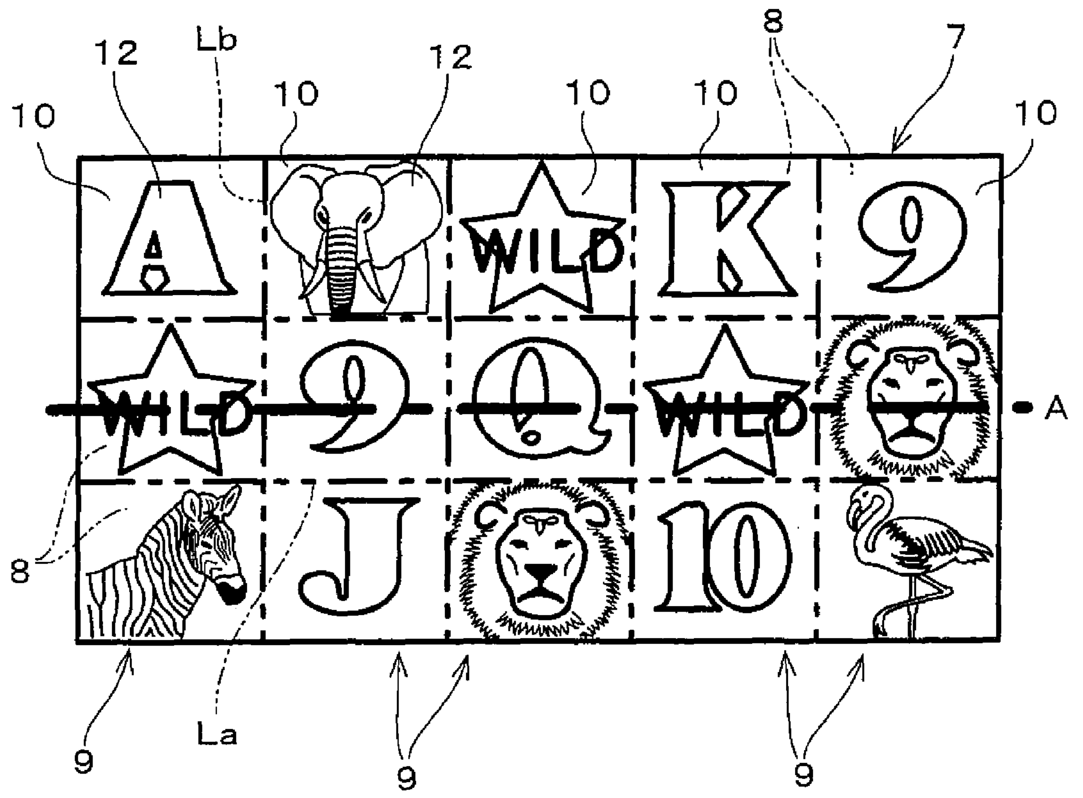
FIG. 2 is a diagram illustrating a lottery region in a normal state.

On a display surface of the display device 3, a lottery region 7 is defined. As divided by virtual lines La and Lb in FIG. 2, in the lottery region 7, plural cells 8, each of which serves as a symbol stop position are defined so as to be arranged in a matrix in longitudinal and transverse directions on a screen of the display device 3. In FIGS. 1 and 2, a total of 15 cells 8 are arranged in 3 rows in the longitudinal direction and 5 columns in the transverse direction. One cell column 9 is configured by the plural cells 8 arranged linearly in the longitudinal direction. Therefore, in the lottery region 7, five cell columns 9 are arranged so as to be parallel to each other in the transverse direction.

Figure 3:
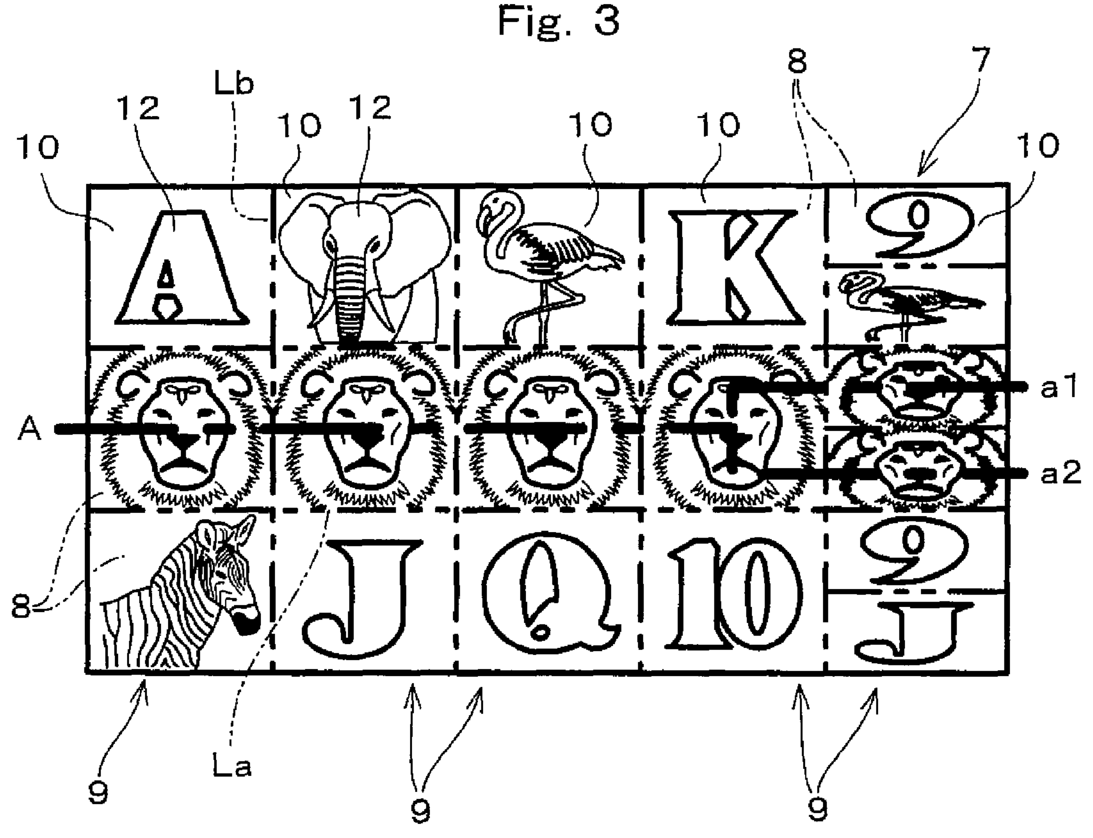
FIG. 3 is a diagram illustrating a lottery region in a partial reduction state.

As can be seen by comparing FIGS. 2 and 3, the cell column 9 that is disposed on a right end of the lottery region 7 is defined as a variable cell column that can be varied between a normal cell column (refer to FIG. 2) where three cells 8 having a predetermined size are arranged in a column direction (longitudinal direction) and a reduced cell column (refer to FIG. 3) where six cells 8 of which a size in the column direction is reduced to ½ are arranged. The other cell columns 9 are fixed as the normal cell columns. In the following description, as illustrated in FIGS. 1 and 2, a state where all of the cell columns of the lottery region 7 are set to the normal cell columns and fifteen cells 8 exist in the lottery region 7 may be referred to as a normal state, and as illustrated in FIG. 3, a state where the variable cell column is set to the reduced cell column and the number of cells is larger than that of the normal state may be referred to as a partial reduction state. The change in the cell number will be described in detail below. The virtual lines La and Lb that are illustrated in FIGS. 2 and 3 are boundary lines of the cells 8 that may be displayed on the display device 3 according to an aspect where a player can visually recognize the lines or may not be displayed. That is, the cells 8 may be logically or ideally defined in the gaming machine 1 as the symbol stop positions in the lottery region 7, and the boundaries thereof do not need to be visually recognized.

Figure 4:
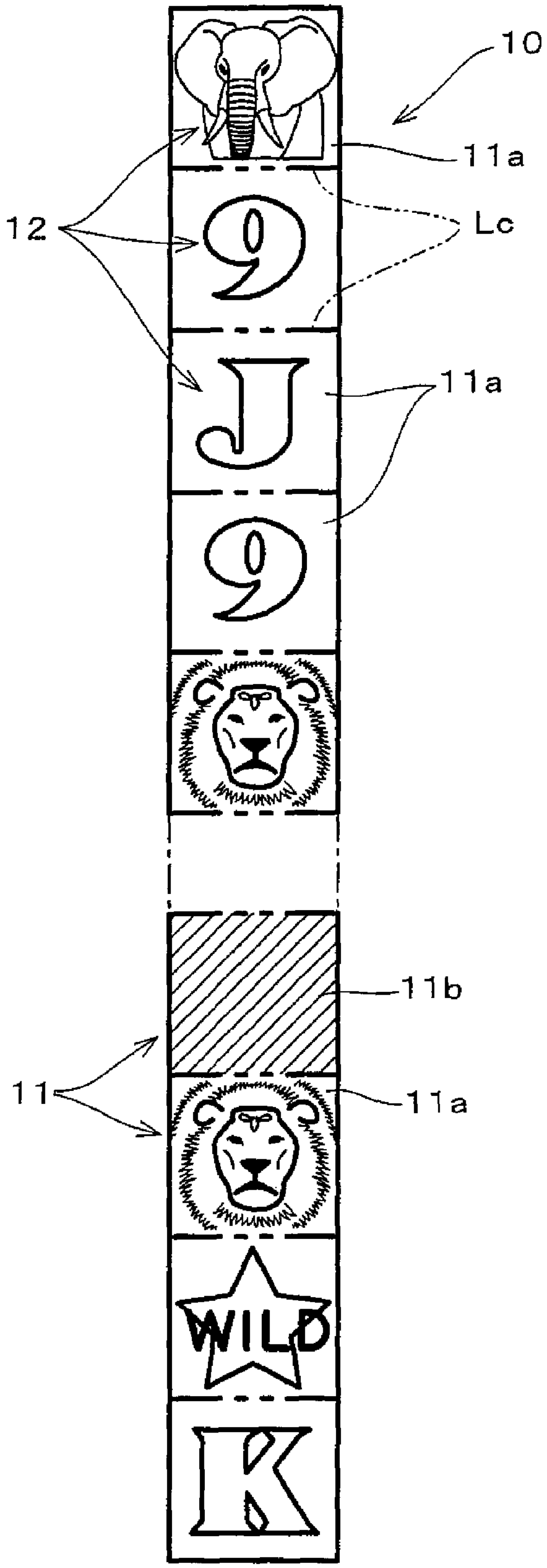
FIG. 4 is a partial development diagram of a virtual reel serving as a symbol column.

On the display device 3, five virtual reels 10 are displayed to correspond to the individual cell columns 9. In FIGS. 2 and 3, only a portion of each virtual reel 10 that overlaps the lottery region 7 is illustrated. Each virtual reel 10 serves as a symbol column and the virtual reel 10 that corresponds to the cell column 9 of the right end is set as the variable symbol column. The configuration of one virtual reel 10 is illustrated in FIG. 4. The virtual reel 10 has the configuration where symbols regions 11 of a predetermined number are arranged in one direction, and the total length is sufficiently longer than that of the cell column 9. The size of one symbol region 11 is the same as that of one cell 8. The symbol region 11 includes a fixed region 11*a* and a variable region 11*b* (illustrated by hatching). In each fixed region 11*a*, any one of plural kinds of symbols 12 is fixedly disposed. That is, the symbol 12 that is disposed in each fixed region 11*a* is not varied. As the symbols 12, numerals, characters, and figures such as an elephant, a lion, and a zebra are appropriately adopted. The symbol 12 to which characters of "WILD" are added serves as a universal symbol that can server as the other symbols 12, in a prize winning determination.

On the other hand, in the variable region 11*b*, one symbol 12 is chosen from the plural kinds of symbols 12 and is disposed. That is, the symbol 12 that is disposed in the variable region 11*b* is appropriately changed. The number of symbols 12 that are disposed on one virtual reel 10 may be appropriately selected. It is preferable that the number of the symbols 12 is equal to or greater than a maximum number of cells at the time when the most cells in one cell column are varied to the reduced cells. The arrangement of the symbols 12 in each of the five virtual reels 10 may be the same or be different. The direction of the cell column 9 in the lottery region 7 is matched with the arrangement direction of the symbols 12 in the virtual reel 10. In the lottery region 7, one symbol 12 on the virtual reel 10 is displayed to be allocated to one cell 8. In FIG. 4, the boundary of the symbol region 11 is illustrated by a virtual line Lc. However, in an image of the virtual reel 10 that is displayed on the display device 3, the boundary thereof may be displayed or not displayed. Ideally, the virtual reel 10 is configured in a cylindrical shape, similar to a mechanical reel where symbols are arranged on outer circumference of a cylindrical body. FIG. 4 illustrates a state where the virtual reel 10 is developed.

If a game starts, each virtual reel 10 is scrolled from the top to the bottom along the cell column 9. The scrolling is to virtually represent the movement of the symbols when a physical reel rotates by replacing the movement by image display. At a predetermined stop time, each virtual reel 10 stops in a state where one symbol 12 is represented in one cell 8. That is, the stop position of the scroll of the virtual reel 10 (which may be simply called the stop position of the virtual reel 10) is controlled in one cell unit. This characteristic is the same, regardless of whether the game is in a normal state or a partial reduction state.

Figure 5:
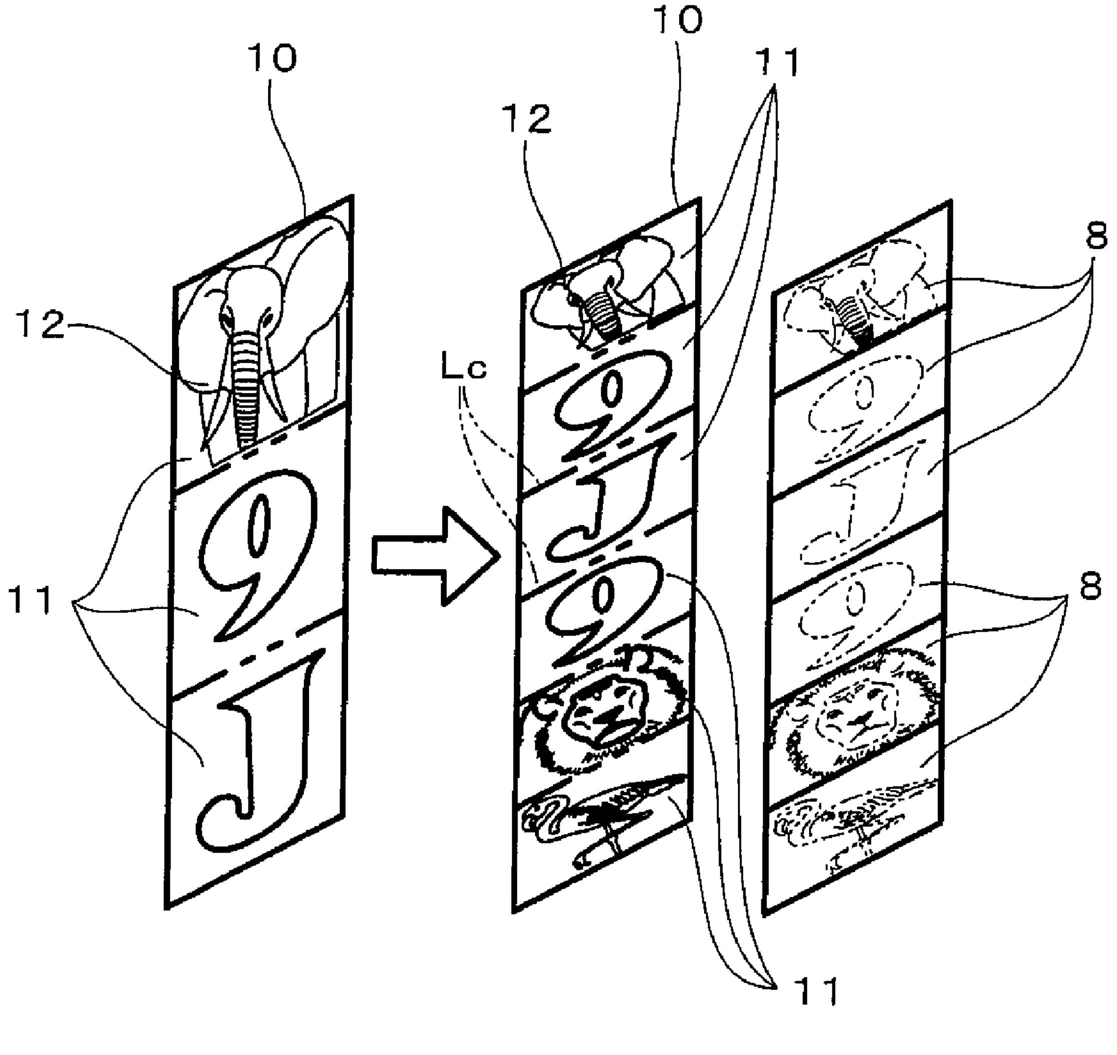
FIG. 5 is a diagram illustrating a correspondence relationship between reduced cells in a reduced cell column and symbols on the virtual reel.

That is, as illustrated in FIG. 5, in the partial reduction state, the size of the cell 8 in the column direction is reduced to ½ of the size in the normal state, and the six cells 8 are arranged on one cell column 9 on the lottery region 7. According to the reduction of the cell 8, the size of each symbol region 11 of the virtual reel 10 is reduced to ½ in the same direction (arrangement direction of the symbols 12), and the size of the image of the symbol 12 is reduced to ½ in the same direction according to the reduction. The stop position of the reduced virtual reel 10 is controlled using the reduced size of one cell 8 as a unit. That is, if the normal state and the partial reduction state are compared with each other, the normal state and the partial reduction state are different from each other in that the symbol stop positions of all of the cell columns 9 are three in the normal state, but the symbol stop positions of only the cell column 9 of the right end are 6 in the partial reduction state, and the virtual reel 10 of the right end is displayed in a state where the size thereof is reduced to ½ in the column direction. In both the normal state and the partial reduction state, the stop position of the virtual reel 10 is controlled in a cell unit.

The symbol stop position means a position where the symbol 12 is to be stopped and has the same meaning as each cell 8. On the other hand, the stop position of the virtual reel 10 means a position when the scroll of the virtual reel 10 is stopped. The stop position of the virtual reel 10 can be distinguished according to which symbol 12 on the virtual reel 10 is displayed in each cell 8 serving as the symbol stop position, when the scroll is stopped.

Figure 6:
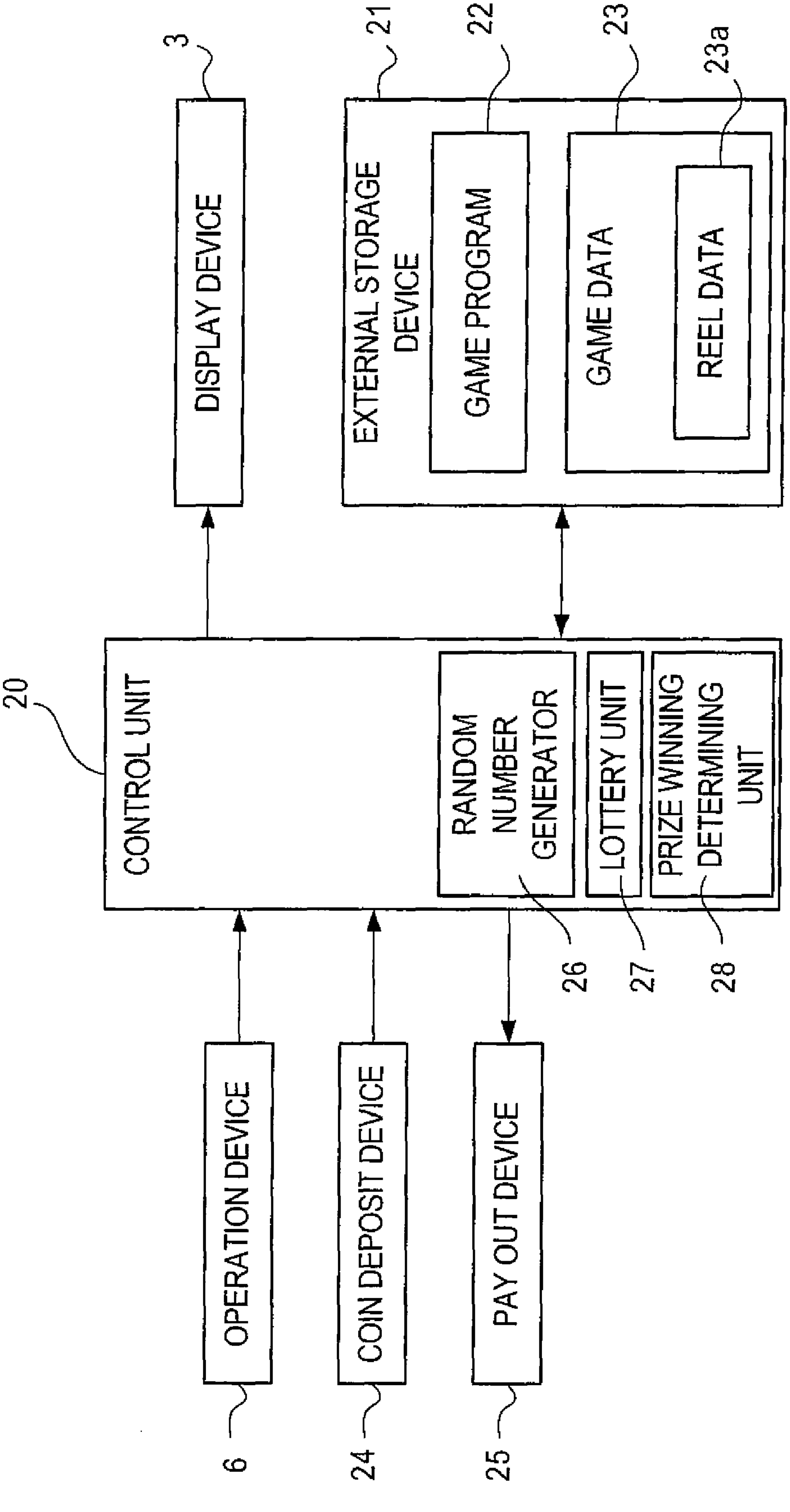
FIG. 6 is a block diagram of a control system in the gaming machine of FIG. 1.

FIG. 6 illustrates the schematic configuration of a control system of the gaming machine 1. In the gaming machine 1, a control unit 20 is provided. The control unit 20 is configured as a computer unit including a microprocessor and other peripheral devices, such as a main storage device needed for the operation thereof and the like. The control unit 20 is connected to an external storage device 21. The external storage device 21 has a nonvolatile storage medium, such as a magnetic storage medium, a DVD-ROM, or an EEPROM. The storage medium thereof stores a game program 22 and game data 23 that are needed to cause the control unit 20 to control a game according to a predetermined sequence. The game program 22 is appropriately read by the control unit 20 and is executed. Also, the game data 23 is appropriately read by the control unit 20 and is referred to. The game data 23 includes reel data **23*a*. The reel data 23*a* is data that describes kinds of the symbols 12 in each symbol region 11 of the virtual reel 10. In the reel data 23*a* on the external storage device 21, information indicating that the symbol 12 to be disposed in the variable region 11*b*** is not fixed is described.

The control unit 20 is connected to the operation device 6 and the display device 3. The operation device 6 outputs a signal according to the operation from the player to the control unit 20. The display device 3 displays an image according to an image signal output from the control unit 20. The control unit 20 executes a game in a predetermined sequence according to the game program 22, referring to the output signal of the operation device 6, and displays a game screen according to a progress situation of the game on the display device 3. On the game screen, an image indicating the lottery region 7 and an image of a portion of the virtual reel 10 to be displayed in the lottery region 7 (that is, symbol 12 to be displayed in each cell 8) are displayed. These images are displayed on the screen of the display device 3 and the control unit 20 serves as a symbol column display unit.

As an input device or an output device that is needed to execute the game, in addition to the operation device 6 and the display device 3, a coin deposit device 24 and a payout device 25 are connected to the control unit 20. The coin deposit device 24 receives a deposit of coins as a price for playing a game, and outputs a signal according to the deposit amount to the control unit 20. The payout device 25 executes payment as an allotment of the game to the player, according to an instruction from the control unit 20. As described above, payment of the price on playing the game and provision of the allotment to the player are not limited to the example using coins. As alternative currency, medals or tokens may be used. Also, a settlement method that enables an exchange of a currency value or a game value through an exchange of electronic currency or electronic information other than the electronic currency may be used.

In the control unit 20, a random number generator 26, a lottery unit 27, and a prize winning determining unit 28 are provided. The random number generator 26 generates random numbers of predetermined digit number. The random number generator 26 may be a logical device that is realized by a combination of a microprocessor and software or a physical device where electronic circuits are combined. The lottery unit 27 and the prize winning determining unit 28 are logical devices that are realized by a combination of the microprocessor and the software. The lottery unit 27 acquires random numbers from the random number generator 26 and chooses the symbol 12 to be disposed in the variable region **11*b* of the virtual reel 10 or chooses the stop positions of the virtual reels 10. The prize winning determining unit 28 determines whether or not a player wins a prize, when the virtual reels 10 are stopped. In the control unit 20**, a logical device or a physical device that is needed to execute a slot game is appropriately provided, which is not illustrated in the drawings.

Next, a game sequence in the gaming machine 1 will be described. In the gaming machine 1, if a signal indicating that coins corresponding to the amount needed for the game are deposited is output from the coin deposit device 24 to the control unit 20, the betting operation through the operation device 6 is enabled. If a signal indicating the betting operation is output from the operation device 6, a betting process is executed by the control unit 20. The betting process may be permitted in exchange for consuming the predetermined amount of credits reserved on the gaming machine 1 as a right for the player to play the game. If a signal instructing to start the game is output from the operation device 6 in a state where betting of at least a minimum unit is performed, the control unit 20 determines that one game opportunity is generated, and executes a slot game routine illustrated in FIG. 7. As a result, the slot game using the virtual reels 10 is played on the gaming machine 1. Hereinafter, the slot game routine will be described.

Figure 7:
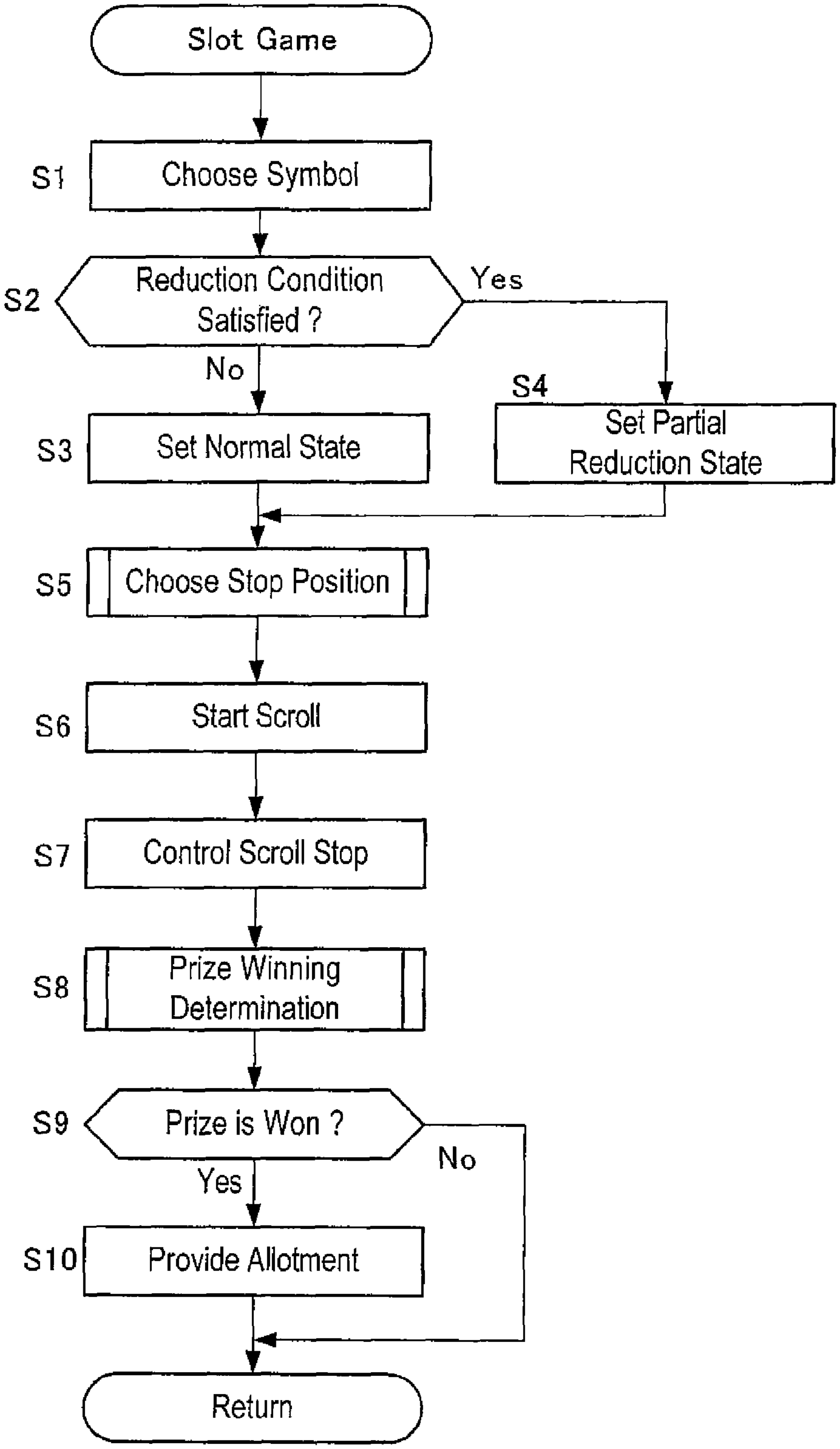
FIG. 7 is a flowchart illustrating a slot game routine to be executed by a control unit.

If the game routine of FIG. 7 is started, first, in step S1, the control unit 20 chooses the symbol 12 to be disposed in each variable region **11*b* of the virtual reel 10. The lottery is executed when the lottery unit 27 acquires the random numbers from the random number generator 26, as described above. If the symbol 12 to be disposed in the variable region 11***b* is determined, the control unit 20 reads the reel data 23*a* from the external storage device 21, information of the variable region 11*b* of the reel data 23*a* is replaced by information indicating the symbol 12 chosen in step S1, and the reel data 23*a* after the replacement (after update) is stored in the main storage device of the control unit 20. This process is executed for each cell column 9. By referring to the reel data 23*a* after update, the control unit 20 can specify the arrangement of all of the symbols 12 on the virtual reels 10 that are disposed in the individual cell columns 9.

Next, in step S2, the control unit 20 determines whether or not the condition for generating the partial reduction state (reduction condition) is satisfied. The reduction condition may be appropriately set. For example, the reduction condition may be set such that it is satisfied when an amount of coins betted by the player exceeds a predetermined amount. When the result of the previously executed slot game attains the predetermined result, the reduction condition may be set to be satisfied in a next game. The reduction condition may be set to be randomly satisfied. When the reduction condition is not satisfied in step S2, the control unit 20 proceeds to step S3 and sets a game state to a normal state. In this case, in the control unit 20, the cells 8 are defined on the assumption that all of the cell columns 9 of the lottery region 7 are the normal cell columns, and each virtual reel 10 is not reduced and is displayed on the screen with the original size.

On the other hand, when the reduction condition is satisfied in step S2, the control unit 20 proceeds to step S4. In step S4, the control unit 20 sets the game state to the partial reduction state. In this case, in the control unit 20, the cells 8 are defined on the assumption that the variable cell column 9 of the right end of the lottery region 7 is the reduced cell column, that is, the cell column in which the six reduced cells where the size of one cell 8 of the normal cell column is reduced to ½ in the column direction are arranged, and the virtual reel 10 of the right end is displayed such that the size thereof is reduced to ½ in the direction of the cell column 9. The other cell columns 9 and virtual reels 10 are set in the same way as the case of the normal state and are displayed.

After the game state is set in steps S3 or S4, the control unit 20 proceeds to step S5. In step S5, the control unit 20 executes a subroutine that chooses the stop positions of the virtual reels 10. The contents of the subroutine will be described in detail below. Next, in step S6, the control unit 20 starts the scrolling of each virtual reel 10. Next, in step S7, the control unit 20 stops each virtual reel 10 at the stop position determined in step S5. Then, the control unit 20 proceeds to step S8 and executes a subroutine for the prize winning determination. The contents of the subroutine will be described in detail below.

Next, in step S9, the control unit 20 determines whether or not the player wins a prize, using the prize winning determining unit 28. In this case, the prize winning means that a combination of the symbols 12 appearing on a determination target line of the lottery region 7 corresponds to a predetermined prize winning pattern. The determination target line is a virtual line that connects groups of the plural cells 8 to become determination targets on whether the prize winning pattern is formed. For example, if the cells 8 that are positioned at the center of each cell column 9 are set as the determination target cell group, as illustrated by a chain line A in FIG. 2, a line that penetrates the central cell 8 of each cell column 9 in a row direction is the determination target line. The determination target line is not limited to the example illustrated in FIG. 2. A line that penetrates the cell 8 of an upper end or a lower end of each cell column 9 in the row direction, or a line that connects the cells 8 in a V-shape may be set as the determination target line. The determination target line may be varied according to the number of bets. For example, if coins of the predetermined amount are betted, a line that connects the central cells 8 in the column direction may be set as the determination target line, and the determination target line may be added whenever the betting amount increases by a predetermined unit. The player may designate the determination target line from the plural lines.

In the partial reduction state, in the reduced cell column 9, the two cells 8 that are continuous in a range of one cell 8 to be positioned on a determination line in a state before reduction are handled as the determination target cells 8 on the reduced cell column 9. For example, as illustrated in FIG. 3, when the determination target line A is set to penetrate the center of each cell column 9, both the two cells 8 that are positioned at the center on the reduced cell column 9 of the right end are handled as the cells included on the determination target line A. In this case, a first cell group that is positioned on a first line a1 including the third cell 8 from the top in the cell column 9 of the right end and a second cell group that is positioned on a second line a2 including the fourth cell 8 from the top in the cell column 9 of the right end are individually selected as the determination target cells 8, and it is determined whether a combination of the selected cells 8 and the symbols 12 stopped in the cells 8 on a determination line of the other cell column 9 forms a prize winning pattern.

When it is determined in step S9 that the prize is won, the control unit 20 proceeds to step S10, and provides the prize winning contents, that is, the allotment according to the kind of the symbols 12 forming the prize winning pattern to the player. The allotment is provided in form of a payout of coins or a right to play a game. The right to play the game is quantitatively expressed in a unit referred to as a credit. The value of the allotment is basically varied in relation to the probability of the prizing winning pattern being formed. In the case of the prize winning pattern where the probability of the prize winning pattern being formed is low, the value of the allotment that corresponds to the formation is set high. When the allotment is provided in step S10, the control unit 20 terminates the current slot game routine. When it is determined in step S9 that the prize is not won, the control unit 20 skips step S10 and terminates the slot game routine.

Figure 8:
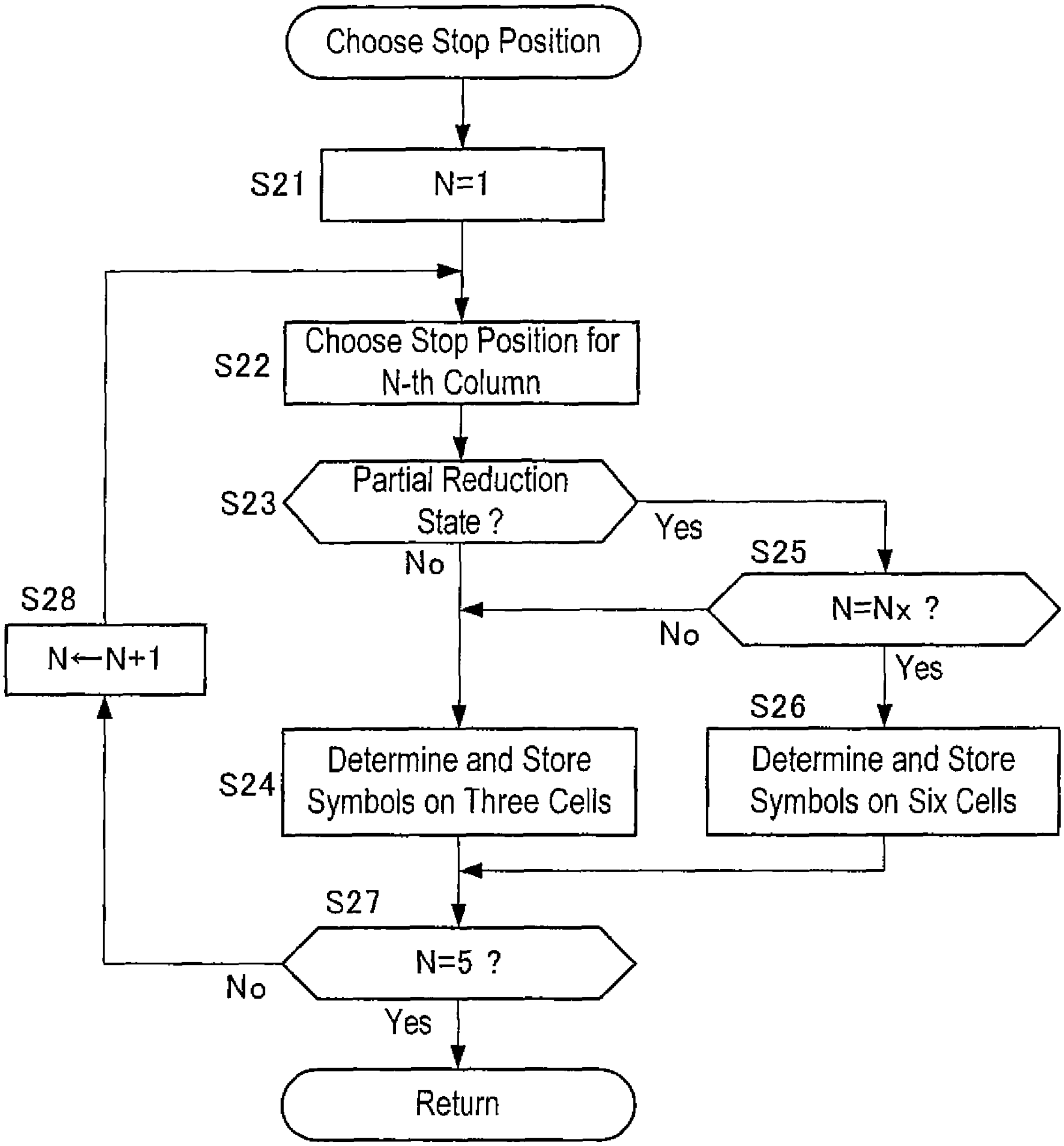
FIG. 8 is a flowchart illustrating a stop position lottery routine to be executed by the control unit.

FIG. 8 illustrates a stop position lottery routine that is called and executed in step S5 of FIG. 7, as a subroutine process with respect to the slot game routine. If the control unit 20 starts the stop position lottery routine, first, in step S21, an initial value 1 is set to a variable N to specify a column number of the lottery target cell column 9 in step S21. In this case, the column number increases in the order of 1, 2 . . . from the cell column 9 of the left end of the lottery region 7. Next, in step S22, the control unit 20 chooses the stop position of the virtual reel 10 in the lottery target cell column (N-th cell column) 9. The lottery is executed when the lottery unit 27 acquires the random numbers from the random number generator 26. From the lottery result, a relationship between the symbol 12 and the cell 8 where the symbol 12 is positioned in which the scroll of the virtual reel 10 needs to be stopped is determined. For example, in the virtual reel 10 of FIG. 4, when numbers are added in the order of 1, 2, . . . from the upper end in each symbol region 11, whether the scroll of the virtual reel 10 needs to be stopped when the symbol region 11 of any number is positioned at the cell 8 of the upper end of the cell column 9 can be determined according to the lottery result. If a number of the symbol region 11 stopped in any cell 8 is determined, a number of the symbol region 11 that is stopped in another cell 8 in the same cell column 9 is also determined.

If the stop position of the virtual reel 10 has been chosen, the control unit 20 proceeds to step S23, and determines whether the current state is the partial reduction state. When the determination result of step S2 of FIG. 7 is affirmative, the determination result of step S23 is also affirmative, and when the determination result of step S2 of FIG. 7 is negative, the determination result of step S23 is also negative. When it is determined in step S23 that the current state is not the partial reduction state, the control unit 20 proceeds to step S24. In step S24, the control unit 20 determines the symbols 12 to be displayed on the three cells 8 included in the lottery target cell column 9, referring to the stop position of the virtual reel 10 chosen in step S22 and the arrangement of the symbol 12 specified by the reel data 23*a* held in the main storage device of the control unit 20. Then, the control unit 20 stores the kinds of determined symbols 12 to be displayed on the three cells 8. After that, the control unit 20 proceeds to step S27 and determines whether the variable N reaches 5. When it is determined that the variable N does not reach 5, the control unit 20 proceeds to step S28 and adds 1 to the variable N, and returns to the process of step S22.

On the other hand, when it is determined in step S23 that the current state is the partial reduction state, the control unit 20 determines whether the variable N is matched with a number Nx (Nx=5 in the example of FIG. 3) of the reduction target cell column 9. When it is determined that the variable N is not matched with the number, the control unit 20 proceeds to step S24. When it is determined in step S25 that the variable N is matched with the number, the control unit 20 proceeds to step S26. In step S26, the control unit 20 determines the symbols 12 to be displayed on the six cells 8 included in the lottery target cell column 9 (reduced cell column in this case), referring to the stop position of the virtual reel 10 chosen in step S22 and the arrangement of the symbol 12 specified by the reel data 23*a* held in the main storage device of the control unit 20. Then, the control unit 20 stores the kinds of determined symbols 12 to be displayed on the six cells 8. After that, the control unit 20 proceeds to step S27. When it is determined that the variable N is matched with 5, the control unit 20 terminates the stop position lottery routine and returns to the routine of FIG. 7. By executing the above described subroutine, all symbols 12 to be displayed on the cells 8 are determined and stored.

Figure 9:
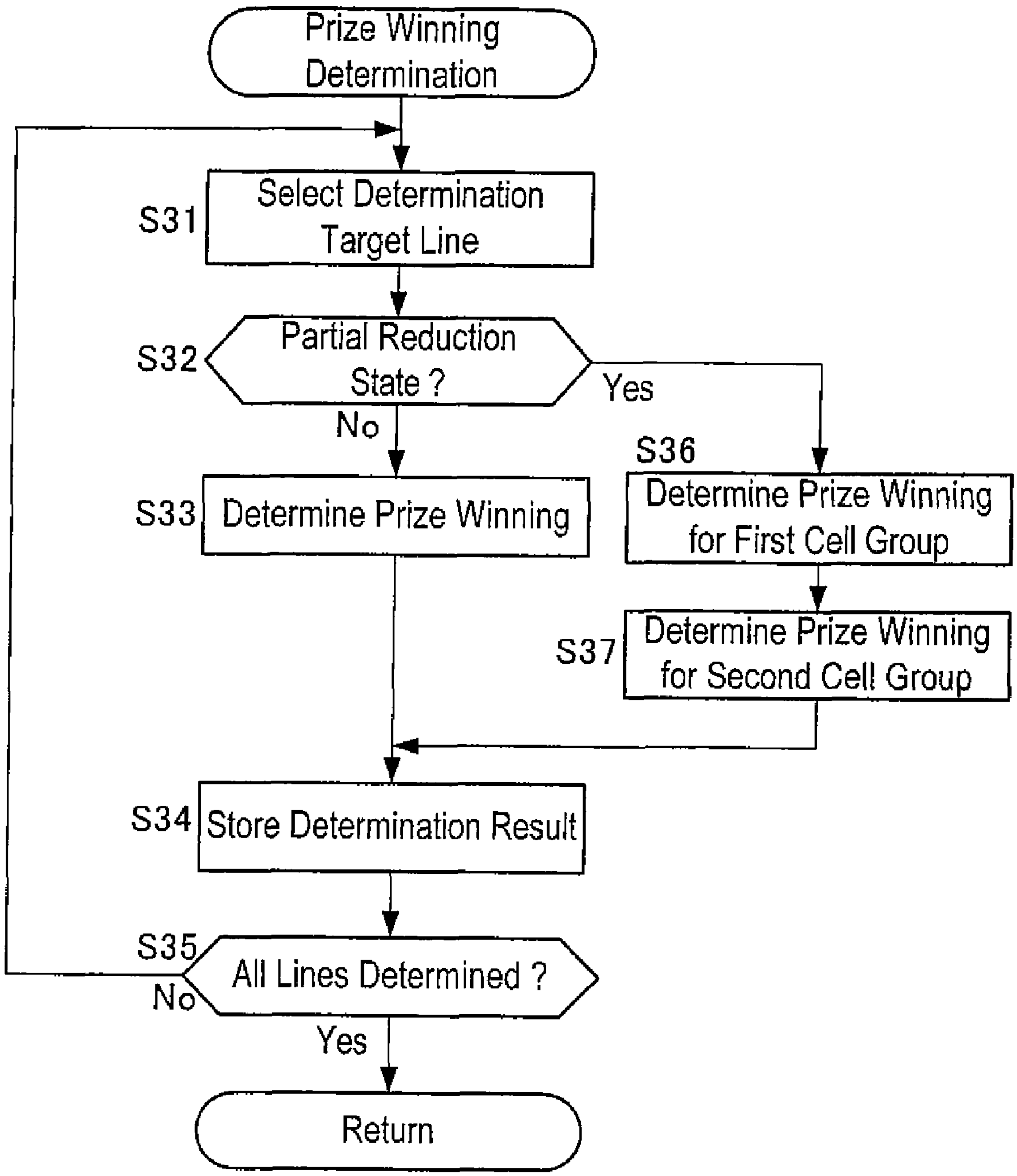
FIG. 9 is a flowchart illustrating a prize winning determination routine to be executed by the control unit.

FIG. 9 illustrates a prize winning determination routine that is called and executed in step S8 of FIG. 7, as a subroutine process with respect to a slot game routine. This process is executed using the prize winning determining unit 28. If the control unit 20 starts the prize winning determination routine, first, in step S31, the control unit 20 selects any one determination target line. As described above, the determination target line is appropriately set according to the number of bets, the selection by the player and the like. Next, in step S32, the control unit 20 determines whether the current state is the partial reduction state. This determination is the same as that of step S23 of FIG. 8. When it is determined that the current state is not the partial reduction state, the control unit 20 proceeds to step S33, and determines whether the symbols 12 in the five cells 8 positioned on the selected determination target line form the predetermined prize winning pattern. For example, when the kinds of all of the symbols 12 on the determination target line are the same, it is determined that the prize winning pattern is formed. Next, in step S34, the control unit 20 stores a prize winning determination result and proceeds to step S35. In step S35, the control unit 20 determines that the prize winning determination is performed on all of the determination target lines. When the non-determined determination target line remains, the control unit 20 proceeds to step S31 and selects a new determination target line. When only one determination target line is set, the determination result of step S35 is affirmative.

When it is determined in step S32 that the current state is the partial reduction state, the control unit 20 proceeds to step S36, and selects the first cell group positioned on the first line a1 (refer to FIG. 3) as a target to thereby determine whether the symbols 12 on the cells 8 form the prize winning pattern. Next, in step S37, the control unit 20 selects the second cell group positioned on the second line a2 as the target to thereby determine whether the symbols 12 on the cells 8 form the prize winning pattern. After the process of step S37, the process proceeds to step S34. In this case, the determination results of the first cell group and the second cell group are stored.

When it is determined in step S35 that the prize winning determination is performed on all of the determination target lines, the control unit 20 terminates the prize winning determination routine and returns to the routine of FIG. 7. Then, in step S9 of FIG. 7, it is determined whether or not to win a prize, on the basis of the determination result stored in step S34 of FIG. 9. When the current state is the partial reduction state, in one determination target line, a prize winning pattern may be formed by each of the first cell group and the second cell group. For example, even though the prize winning pattern is not formed by one of the first cell group and the second cell group, the prize winning pattern may be formed by the other cell group. As exemplified in FIG. 3, when the symbol 12 (lion in FIG. 3) that is allocated to the reduced variable region 11*b* of the virtual reel 10 is the same as the symbol 12 allocated to the adjacent fixed region 11*a*, if the symbols 12 are stopped in the cells 8 on the determination target line, the prize winning pattern is realized by each of the first cell group and the second cell group. In the processes of steps S9 and S10 of FIG. 7, if the prize winning pattern is realized by one of the first cell group and the second cell group, it is determined that the prize is won and the allotment corresponding to the prize winning pattern is provided. When the prize winning pattern is formed by each of the first cell group and the second cell group, the allotments corresponding to those prize winning patterns are provided.

As is apparent from the above description, in the gaming machine 1, on the reduced cell column 9, it is possible to make two symbols 12 that are adjacent to each other on the virtual reel 10 arbitrarily be displayed with respect to the two cells 8 that are handled as the cells existing on the determination target line. For this reason, when the partial reduction state is generated, the probability of the prize winning pattern being formed increases as compared with the probability in the normal state. Thereby, it is possible to heighten a player's expectation for the realization of the prize winning pattern, and to heighten motivation for playing the game.

In the gaming machine 1, a part of the symbol regions 11 on the virtual reel 12 is configured as the variable symbol region 11*b* and the symbol 12 to be disposed in the variable symbol region 11*b* is selected by the lottery. Accordingly, when the same symbol 12 is disposed in the variable symbol region 11*b* and the symbol region 11 adjacent to the variable symbol region 11*b*, two sets of prize winning patterns may be formed with respect to one determination target line. As a result, the allotment higher than that of the normal case can be provided to the player.

In the above embodiment, the control unit 20 serves as the lottery region defining unit by defining the cells 8 serving as the symbol stop positions. The control unit 20 serves as the lottery unit by executing the stop position lottery routine of FIG. 8, serves as the symbol column movement control unit and the symbol column image control unit by executing the processes of steps S6 and S7 of FIG. 7, serves as the prize winning unit by executing the prize winning determination routine of FIG. 9, and serves as the state control unit by executing the process of step S3 or S4 according to the determination result of step S2 of FIG. 7. The control unit 20 serves as the symbol selecting unit by executing the process of step S1 of FIG. 7.

Figure 10A:
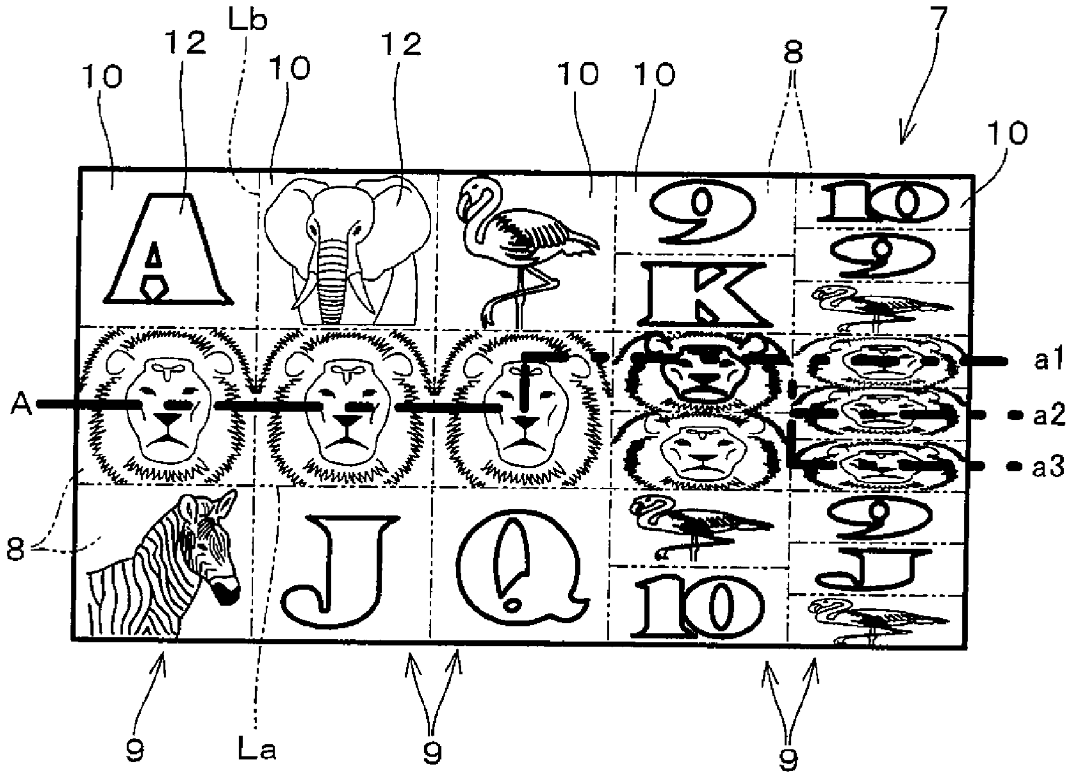
FIG. 10A is a diagram illustrating a modification of FIG. 3 with a part of determination target lines.
Figure 10B:
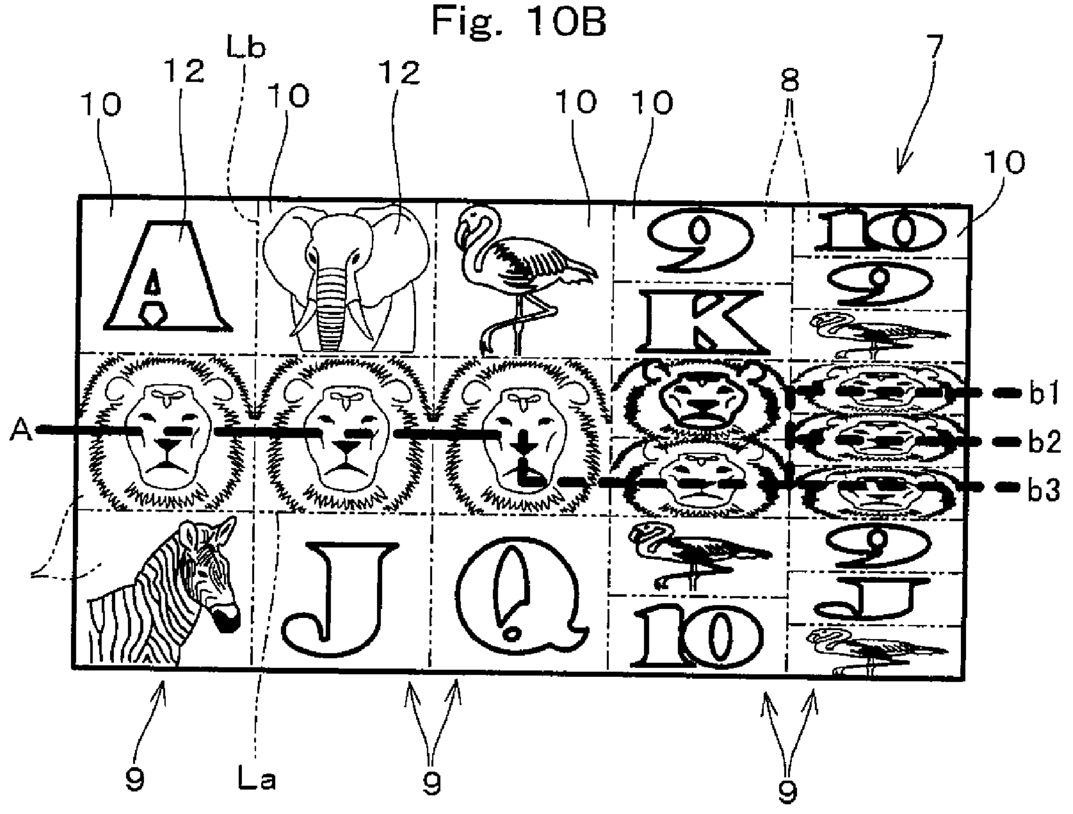
FIG. 10B is a diagram illustrating the modification of FIG. 3 with another part of the determination target lines.

The invention is not limited to the above embodiment, and can be embodied in an appropriate form. For example, the variable cell column is not limited to the cell column 9 of the right end of the lottery region 7, and another cell column 9 may be set as the variable cell column. The plural cell columns 9 may be set as the variable cell columns. For example, as illustrated in FIG. 10, the cell column of the right end and the cell column 9 adjacent to the cell column may be set as the variable cell columns. The size of the reduced cell in the reduced cell column is not limited to the size obtained by dividing one cell (normal cell) in the normal cell column into two parts. As exemplified in the cell column 9 of the right end of FIG. 10A, the size of the reduced cell may be set to the size obtained by dividing one normal cell 8 into three parts or more. In the example of FIG. 10A, it is possible to select one reduced cell from each of the reduced cell columns to perform the prize winning determination. For instance, if one determination target line A is set so as to penetrate central cells 8 in the normal cell columns, as illustrated in FIG. 10A, it is possible to define three lines a1, a2, and a3 that connect an upper reduced cell 8 in the second reduced column from the right and each of three reduced cells 8 in the right end reduced cell column, and is possible to define three lines b1, b2 and b3 that connect a lower reduced cell in the second reduced cell column from the right and each of three reduced cells 8 in the right end reduced cell column. Therefore, there is generated a possibility that the prize winning pattern may be formed with respect to each of the six cell groups corresponding to lines a1-a3 and b1-b3, respectively. The number of cell columns and the number of cells to be disposed in each cell column may be appropriately changed.

Figure 11:
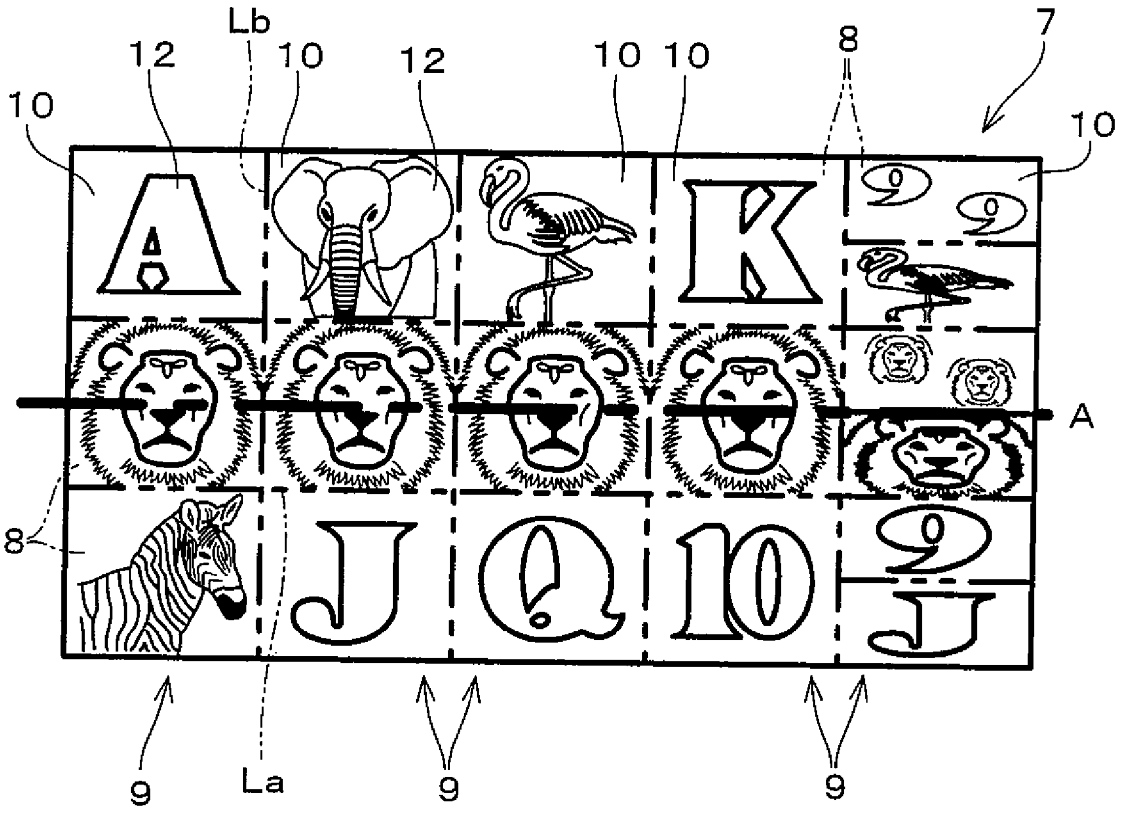
FIG. 11 is a diagram illustrating another modification of FIG. 3.

In the invention, the number of symbols 12 that appear in one cell 8 is not limited to one. For example, in FIG. 11, as exemplified in the reduced cell column 9 of the right end, the symbol column may be configured such that the plural symbols appear in the region corresponding to one cell on the symbol column, thereby increasing the probability of the high allotment being provided or increasing the probability of the prize winning pattern being formed. The plural symbols that are disposed in the region on the symbol column corresponding to one cell may be the same or different from each other.

The invention is not limited to an embodiment where all of the symbol columns are displayed as images on the screen of the display device. For example, some of the symbol columns may be represented by the images and the remaining symbol columns may be configured by the physical reel. In this case, at least a part of the symbol columns based on the images may be set as the variable symbol column and the size of the symbol on the variable symbol column may be varied in relation to the cell. However, the invention is not limited to the example where the reduced cell column is defined as one form of the variable cell column. That is, the invention includes an embodiment in which a part of the cell columns is always defined as the reduced cell column and the size of each symbol of the symbol column corresponding to the reduced cell column is adjusted according to the size of each cell in the reduced cell, so that the partial reduction state is always generated. The cell column that is fixed as the reduced cell column and the cell column that is set as the variable cell column may be mixed.

When the variable cell column is varied as the normal cell column or the reduced cell column, the symbol column corresponding to the variable cell column is not limited to the virtual symbol column that is displayed by the image, and may be a symbol column using a structure, such as a physical reel. A virtual symbol column to be displayed as an image and a symbol column utilizing a structure, such as a physical reel, may be combined with each other. For example, with respect to the cell column that is fixed as the reduced cell column, a physical reel where the size of the symbol in the symbol arrangement direction is reduced as compared with the normal cell column may be disposed as the symbol column. As an instance thereof, it can be suggested a structure in which a physical reel on which the normal cell column is disposed is mechanically exchanged for a physical reel on which the reduced cell column is disposed when the reduction condition is satisfied, or a structure in which a shutter capable of selectively masking is provided, and a state where a physical reel with the reduced cell column is masked is switched to a state where a physical reel with the normal cell column, thereby allowing the reel of the reduce cells to be displayed when the reduction condition is satisfied. Further, in the case that a virtual symbol column is to be displayed as an image and a symbol column utilizing a structure, such as a physical reel, are combined with each other, it is allowable that a shutter is provided in front of the physical reel with the reduced cell column, a flat type display unit, such as a liquid crystal display unit, that is capable of being transparent is provided further in front of the shutter, and the display unit can be controlled to display a virtual reel on which the normal cell column is disposed, and that, in the normal state, the shutter is shut to allow the virtual reel on the display unit to be visible, while in the case that the reduction condition is satisfied, the shutter is opened and the display unit is controlled to be transparent to thereby enabling the physical reel to be visible. Alternatively, it is allowable that the normal cell column is disposed on the physical reel, the display unit can be controlled to display the virtual reel on which the reduced cell column is disposed, and that in the case of the normal state, the display unit is controlled to be transparent and the shutter is opened to allow the physical reel to be visible, while in the case that the reduction condition is satisfied, the shutter is closed to make the physical reel invisible and the display unit displays the virtual reel. In this case, the shutter may be omitted depending on the display unit.

Figure 12A:
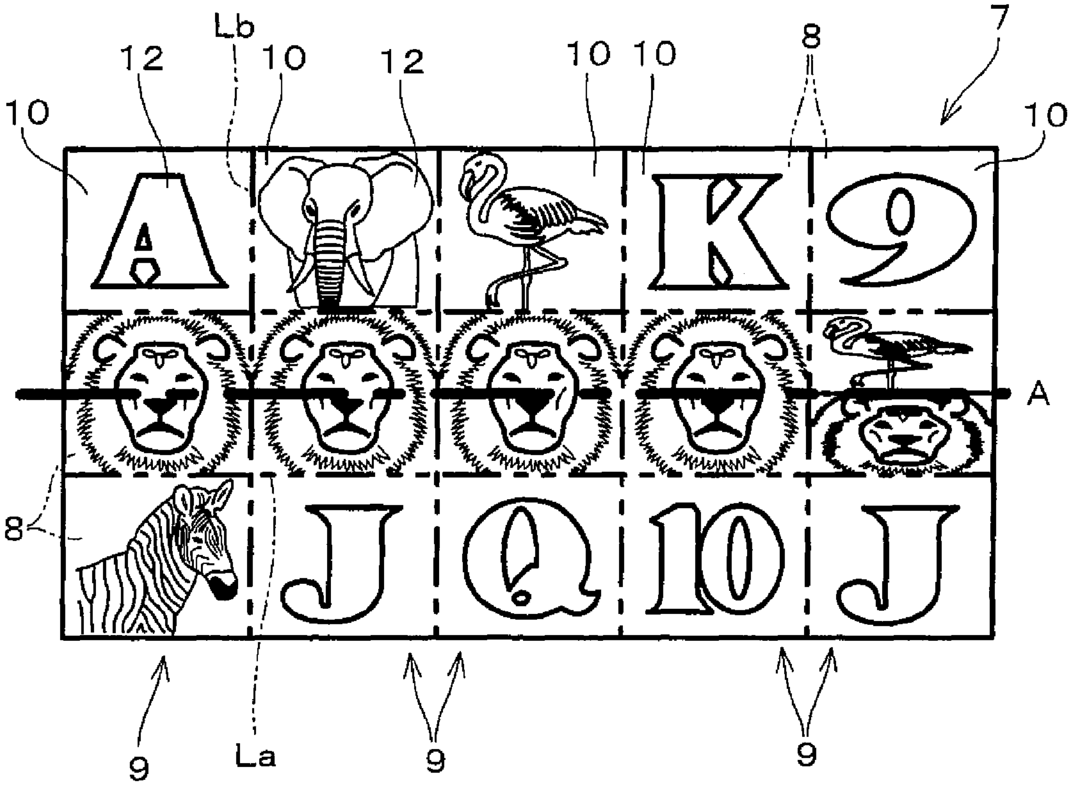
FIG. 12A is a diagram illustrating a modification where a normal cells and reduced cells exist in a reduced cell column.
Figure 12B:
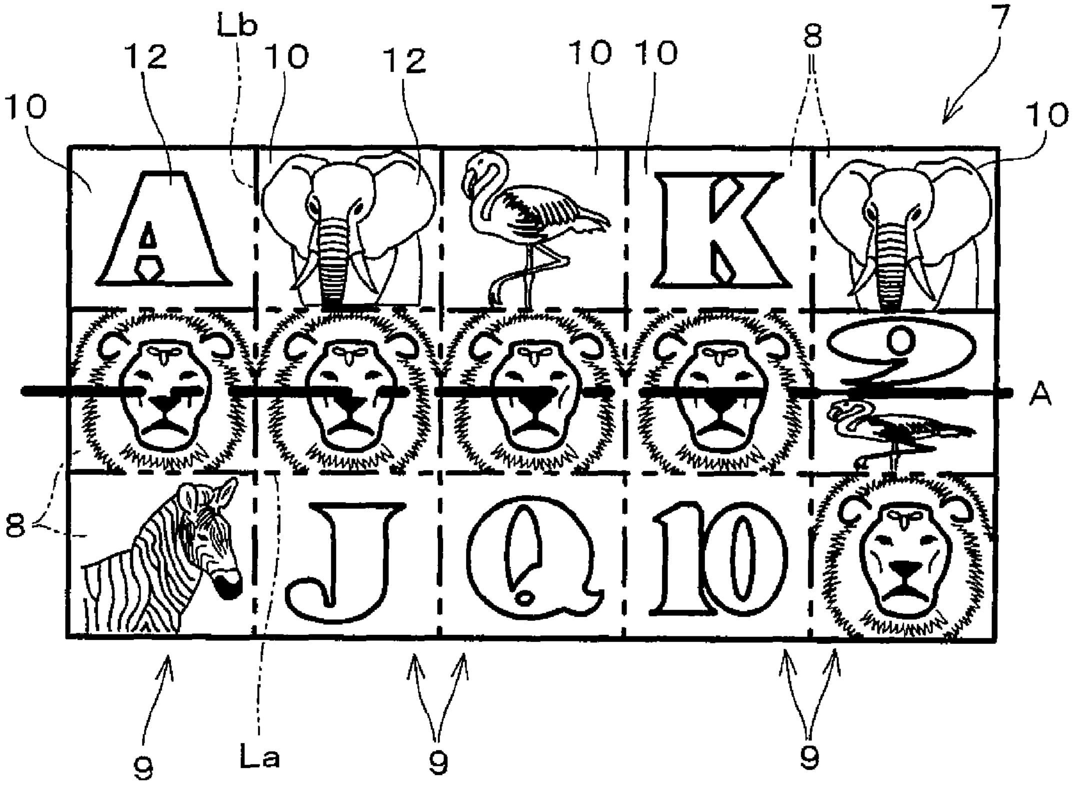
FIG. 12B is a diagram showing state where a virtual reel corresponding to the reduced cell moves downward by an amount corresponding to one cell from the state of FIG. 12A.

Even when the symbol column is realized by the physical structure, if a material that can be expanded and reduced in the symbol arrangement direction is adopted to the structure and an expanded or reduced state is controlled according to the size of each cell of the cell column, the symbol column having the physical structure can serve as the symbol column corresponding to the variable cell column. In the invention, all the cells included in the reduced cell column are not necessarily reduced cells. The normal cell may be included in a part of the reduced cell column, as long as a group of reduced cells continuously spanning the size of at least one normal cell exists in the reduced cell column. One example thereof is shown in FIG. 12A. In this example, the right end cell column is set as the reduced cell column. In the reduced cell column, only two cells 8 positioned in the middle in the column direction are reduced cells and the other cells are the normal cells. In the virtual reel 10 corresponding to the reduced cell column, only the size of the symbol 12 corresponding to each of the reduced cells 8 is reduced to ½ in the column direction in comparison with the size of the symbol 12 corresponding to the normal cell 8. Accordingly, if the virtual reel 10 moves downward by the distance corresponding to one cell from the state in FIG. 12A, the symbol 12 of a lion displayed in the lower reduced cell 8 turns to the size corresponding to the normal cell 8 as illustrated in FIG. 12B.

In the invention, the stop position of the symbol column may be controlled such that the symbol determined by the lottery unit certainly appears in each cell, or the stop position may be controlled so as to add another element, as long as it is controlled on the basis of the lottery result of the lottery unit. For example, the stop position of the symbol may be controlled taking player's operation into account as a new element in such a manner that when the player is required to perform the stop operation and the stop operation is performed during an appropriate period of time, the symbol chosen by the lottery unit is stopped on the corresponding cell, while the stop operation is not performed during the appropriate period of time, the symbol different from the symbol chosen by the lottery unit is stopped on the cell. Further, a direction in which the cell columns are arranged is not limited to the direction perpendicular to the cell columns. For instance, each cell may be defined in a hexagonal shape and thus the cell columns may be arranged such that the cells are disposed to form a honeycomb arrangement.

The invention claimed is:

1. A computer-controlled gaming machine comprising: a processor; a memory; and a display device displaying a lottery region having plural cell columns arranged in a transverse direction, each of said plural cell columns having at least one cell serving as a symbol stop position;

said processor and memory configured to implement:

a lottery unit that controls a plurality of symbol columns with symbols arranged there on so as to chooses a symbol to appear in each cell of the lottery region at a predetermined game opportunity;

a symbol column movement control unit that moves symbols in each symbol column along the cell column at the game opportunity and stops the symbols of each symbol column in a cell of the lottery region on the basis of a lottery result of the lottery unit; and a prize winning determining unit that determines whether a combination of the symbols stopped in a cell group of a determination target forms a prize winning pattern, wherein a partial reduction state is at least temporary generated, in which the lottery region is defined such that the plural cell columns include at least one normal cell column where plural normal cells, each of which has a predetermined size and consists of one symbol, are arranged and at least one reduced cell column where plural reduced cells, each of which is obtained by equally dividing one normal cell in a cell arrangement direction and has at least one reduced symbol, are continuously arranged in at least a portion of the reduced cell column, and in each of the symbol columns, the size of each symbol is set so as to accord with the size of each cell of the corresponding normal cell column or reduced cell column, wherein the symbol column movement control unit stops the symbols of each symbol column in a cell of the lottery region in each cell column, regardless of whether a current state is the partial reduction state or not, and wherein the prize winning determining unit recognizes, when the current state is the partial reduction state, that at least one normal cell and the plural reduced cells continuously spanning over the portion of the reduced cell column in the cell arrangement direction are included in the cell group of the determination target, individually selects the plural reduced cells that are included in the cell group of the determination target, and determines whether a combination of the symbols stopped in the selected reduced cells and the symbols stopped in the normal cells included in the cell group of the determination target forms the prize winning pattern.

2. The gaining machine according to claim 1, wherein at least one of the plural cell columns is a variable cell column capable of being varied between the normal cell and the reduced cell, and a symbol column corresponding to the variable cell in which the size of each symbol can be varied according to the normal cell or the reduced cell, and the processor and memory further configured to implement a state control unit that generates the partial reduction state when a predetermined reduction condition is satisfied, by setting the variable cell column as the reduced cell column and by setting the variable symbol column to the size according to each of the cells in the reduced cell column, and that cancels the partial reduction state when the reduction condition is not satisfied, by setting the variable cell column as the normal cell column and by setting the variable symbol column to the size according to each of the cells in the normal cell column.

3. The gaming machine according to claim 2, wherein at least one of the plural cell columns is defined on a screen of the display device, the processor and memory further configured to implement a symbol column display unit that displays an image of the symbol column so as to correspond to the cell column defined on the screen based on data in which an arrangement of the plural symbols is described, wherein the symbol column movement control unit includes a symbol column image control unit that varies display of the image of the symbol column such that the symbols in the image of the symbol column move along the cell column defined on the screen and that the symbols are stopped in the cell of the lottery region on the basis of the lottery result of the lottery unit, wherein at least one cell column defined on the screen corresponds to the variable cell column, and a symbol column that is displayed as the image on the screen so as to correspond to the variable cell column is set as the variable symbol column, wherein, when the reduction condition is satisfied, the state control unit sets the variable cell column to the reduced cell column and makes the symbol column display unit display the image of the symbol column such that each symbol in the image of the variable symbol column corresponding to the variable cell column becomes the size according to each of the cells in the reduced cell column, however, when the reduction condition is not satisfied, the state control unit sets the variable cell column to the normal cell column and makes the symbol column display unit display the image of the symbol column such that each symbol in the image of the variable symbol column corresponding to the variable cell column becomes the size according to each of the cells in the normal cell column, and wherein the symbol column image control unit stops the symbols in the image of each symbol column in a cell of the lottery region in each cell column, regardless of whether the current state is the partial reduction state or not.

4. The gaming machine according to claim 3, the processor and memory further configured to implement a symbol selecting unit that chooses at least one symbol to be disposed in the image of the symbol column corresponding to the variable cell column from the plural symbols.

5. The gaming machine according to claim 3, wherein all of the plural cell columns are defined on the screen of the display device, wherein the symbol column display unit displays the image of the symbol column corresponding to each of the plural cell columns, and wherein, when in the partial reduction state, a part of the plural cell columns is set as the variable cell column, while a remaining cell column is set as the normal cell column.

6. A computer-controlled gaming machine comprising: a processor; a memory; and a display device;

said processor and memory are configured to implement:

a lottery region defining unit that defines a lottery region on a screen of the display device such that plural cell columns are arranged therein, that plural cells serving as symbol stop positions are arranged in one direction in each cell column, and that the cell columns are arranged in a direction crossing a cell arrangement direction in each cell column;

a symbol column display unit that displays an image of a symbol column, where plural symbols are arranged along the cell arrangement direction in each cell column, so as to correspond to the cell column on the screen of the display device, based on data in which an arrangement of the plural symbols is described;

a lottery unit that chooses a symbol to appear in each cell at a predetermined game opportunity;

a symbol column image control unit that varies display of the image of the symbol column by the symbol column display unit such that the symbols in each symbol column are moved along the cell column at the game opportunity and that the symbols are stopped in the cell of the lottery region on the basis of the lottery result of the lottery unit;

a prize winning determining unit that determines whether a combination of the symbols stopped in a cell group of a determination target forms a prize winning pattern; and a state control unit that generates a partial reduction state, when a predetermined reduction condition is satisfied, in which at least one normal cell, which has a predetermined size and consists of one symbol, is equally divided in the cell arrangement direction to form plural reduced cells in at least one cell column in the plural cell columns and in which symbols corresponding to the reduced cells are reduced to sizes according to the reduced cells, and that cancels the partial reduction state when the reduction condition is not satisfied, wherein the symbol column image control unit stops the symbols of each symbol column in a cell of the lottery region in each cell column, regardless of whether a current state is the partial reduction state or not, and wherein the prize winning determining unit recognizes, when the current state is the partial reduction state, that at least one normal cell, which consists of one symbol, and the plural reduced cells continuously spanning over a predetermined size in the cell arrangement direction are included in the cell group of the determination target, individually selects the plural reduced cells that are included in the cell group of the determination target, and determines whether a combination of the symbols stopped in the selected reduced cells and the symbols stopped in the normal cells included in the cell group of the determination target forms the prize winning pattern.

7. A method for electronically playing a game executed by a computer-based system comprising a control device, a lottery unit, a prize winning determining unit and a display device, said method comprising the steps of:

defining a lottery region on a screen of the display device with the control device such that plural cell columns are arranged therein, where plural cells serving as symbol stop positions are arranged in one direction in each cell column, and the cell columns are arranged in a direction crossing a cell arrangement direction in each cell column;

displaying an image of a symbol column with the display device, where plural symbols are arranged along a cell arrangement direction in each cell column, so as to correspond to the cell column on the screen of the display device, based on data in which an arrangement of the plural symbols is described;

choosing a symbol to appear in each cell at a predetermined game opportunity with the lottery unit;

varying display of the image of the symbol column on the display device with the control device such that the symbols in each symbol column are moved along the cell column at the game opportunity and that the symbols are stopped in the cell of the lottery region on the basis of a lottery result;

determining whether a combination of the symbols stopped in a cell group of a determination target forms a prize winning pattern with the prize winning determination unit;

generating a partial reduction state with the control device, when a predetermined reduction condition is satisfied, in which at least one normal cell, which has a predetermined size and consists of one symbol, is equally divided in the cell arrangement direction to form plural reduced cells in at least one cell column in the plural cell columns and in which symbols corresponding to the reduced cells are reduced to sizes according to the reduced cells; and canceling the partial reduction state with the control device when the reduction condition is not satisfied, wherein a symbol column image control unit stops the symbols of each symbol column in a cell of the lottery region in each cell column, regardless of whether a current state is the partial reduction state or not, and further comprising the steps of;

recognizing by the control device, when the current state is the partial reduction state, that at least one normal cell, and the plural reduced cells continuously spanning over a predetermined size in the cell arrangement direction are included in the cell group of the determination target, individually selecting the plural reduced cells that are included in the cell group of the determination target, and determining whether a combination of the symbols stopped in the selected reduced cells and the symbols stopped in the normal cells included in the cell group of the determination target forms the prize winning pattern with the prize winning determination unit.

* * * * *